United States Patent Office 3,773,959
Patented Nov. 20, 1973

3,773,959
FUNGICIDAL COMPOSITIONS COMPRISING GRISEOFULVIN AND THIABENDAZOLE AND METHODS OF UTILIZING SAME
Nardo Zaias, Miami, Fla., assignor to Research Corporation, New York, N.Y.
No Drawing. Continuation-in-part of abandoned application Ser. No. 170,391, Aug. 9, 1971. This application Aug. 30, 1972, Ser. No. 284,805
Int. Cl. A61k 27/00
U.S. Cl. 424—270
2 Claims

ABSTRACT OF THE DISCLOSURE

It has been found that griseofulvin and thiabendazole, in combination, have a fungicidal effect upon certain dermatophytic fungi and deep mycosis fungi, in particular Trichophyton sp., Microsporum sp., and Epidermophyton sp., *Paracoccidioides brasiliensis*, and *Histoplasma capsulatum*. This effect substantially exceeds that of either component or that to be expected by the combination.

RELATED APPLICATIONS

This application is a continuation-in-part of copending application Ser. No. 170,391 filed Aug. 9, 1971, now abandoned.

FIELD OF THE INVENTION

Novel fungicidal compositions.

DESCRIPTION OF THE PRIOR ART

Griseofulvin is well known as a fungicidal and fungistatic agent, it has been administered orally to humans and its toxicity is well known. Thiabendazole was originally used as an anti-helminthic but was subsequently found to have fungistatic and fungicidal properties and has been well documented as a therapeutic agent against fungal conditions in human use. While griseofulvin must be administered internally, preferably orally, thiabendazole may be administered topically (i.e. transdermally) or orally. While from a point of view of applicatory efficacy, it may be preferable to administer thiabendazole transdermally, this may not always be practical from a clinical viewpoint and the nominally less efficient oral method of administration may in fact be clinically preferable.

Certain dermatophytic fungi such as certain strains of *Trichophyton mentagrophytes* have been found to resist griseofulvin treatment which has heretofore been one of the accepted modes of treatment for such a fungal condition. It it further known that griseofulvin does not dissolve in the human metabolic system but is carried through the dermal layers in solid form. Hence, it has been found helpful to administer griseofulvin as a micro crystalline powder which will more readily travel to the site of infection in this physical form. It will therefore be understood that the dosage of this agent which can be carried by the human system at any one time is somewhat limited. Therefore, the dosage of griseofulvin cannot be limitlessly raised in order to combat a partially or wholly resistant system. Furthermore, the certain deep mycosis exist, which affect internal areas of the body, such as for example, the pulmonary area have in some cases been found inpractical and toxic with known antifungal agents. One of the most troublesome of these deep mycosis, particularly in South America, is that caused by *Paracoccidioides brasiliensis*. This particular organism has heretofore been found to be substantially resistant to both griseofulvin and thiabendazole.

SUMMARY OF THE INVENTION

In vitro screening of certain fungi growths in media conducive to their growth, shows that such growth is inhibited or entirely prevented by the application thereto of griseofulvin in combination with thiabendazole. It has been found that the effect of a combination of from between 1 and 3 parts of griseofulvin to 1 part of thiabendazole has an inhibitory effect upon certain of these organisms of between about 4 to about 20 times as great as that achieved by the administration of similar amounts of the individual components, that is to say, griseofulvin per se or thiabendazole per se.

In vivo tests of these agents in combination with certain of the dermatophytic fungi and deep mycosis fungi indicate that the observed in vitro effect persists in vivo.

It has been found that administration of the combination of the present invention to human subjects obtained remission of symptoms not obtained by the constituents per se.

The griseofulvin component of the combination must be administered internally, that is to say, preferably orally. The thiabendazole component may be administered either transdermally or also internally. The basic finding of the present invention is the enhanced effect achieved by the administration of both griseofulvin and thiabendazole together against certain fungal conditions. While compositions comprising both components are encompassed within the scope of the present invention, their administration in this form is not the sole modification of the present invention and the scope of the present invention should not be considered as being limited thereto.

DESCRIPTION OF THE PREFERRED EMBODIMENTS

It has been found that the administration of griseofulvin and thiabendazole substantially simultaneously to a system affected by certain dermatophytic fungi or certain deep mycosis fungi will achieve a fungistatic or fungicidal effect far greater than that achieved by the administration of either component in the same amounts individually.

It is preferred to administer the components in the ratio of between 1 and 3 parts of griseofulvin to 1 part of thiabendazole. It is especially preferred to administer about 2 parts of griseofulvin to 1 part of thiabendazole. The active components may be compounded in any inert pharmaceutically acceptable carrier, containing between 1% and 20% by weight of the combination.

The griseofulvin is preferably administered internally, most preferably orally, suitably in the form of a micro crystalline powder which is most readily absorbed by the system. The thiabendazole may be administered transdermally in the form of a tincture, onitment, or in similar carrier known to the art, or it may also be administered internally, suitably orally.

The combination of the present invention may be formulated as a combined dosage, that is to say, in a form physically comprising a mixture of thiabendazole and griseofulvin in the desired proportions, or it may be administered as separate tablets or capsules of the components in the desired proportions.

Indeed, since griseofulvin is known in the art to travel to the site of a fungal infection less rapidly than thiabendazole, it has been found preferable to administer the griseofulvin portion of the dosage first and thereafter administer the thiabendazole portion thereof. Preferably the second portion is administered from about 2 to about 4 hours after the first portion.

There may be administered from about 20 to about 100 suitably from about 30 to about 25 mg./kg. body weight of griseofulvin to from about 10 to about 60 suitably from about 0.5 to about 20 mg./kg. of thiabendazole. The absolute amount and frequency of administration of the components will of course depend upon the site and the intensity of the fungal infection as will the mode of administration. The dosage of the combination will lie in the area of from about 5 to about 25 mg./kg., per day of griseofulvin administered orally for a period of from about 15 to about 150 days and from about 20 to about 40 mg./kg. per day of thiabendazole for the same period administered orally and from about 0.3 to about 1.5 mg./kg./day administered topically as an ethanolic tincture to about 1.5 to about 60 mg./kg./day administered topically as an ointment. The mode of administration of the thiabendazole component will depend upon the nature of the fungal infection. In the case of dermatophytic fungi, it is generally preferred to administer the thiabendazole transdermally, that is to say, in the form of an ointment or similar topical carrier. Any of the generally accepted topical carriers, for thiabendazole may be utilized. These will contain from about ¼ to about 10 percent by weight of thiabendazole.

On the other hand, in the case of the deep mycosis fungi topical administration is usually not practical, therefore the internal or oral mode including inhalation, is to be preferred.

In a typical case of facial *T. mentagrophytes* infection in a young boy 2 g. of griseofulvin per day were administered orally for three weeks, one side of the subject's face was additionally treated with ca. 1 gm. per day of thiabendazole ointment (1% TBZ in carrier). The untreated (control) side showed minimal remission, the TBZ treated side showed substantial remission after 4 further weeks of treatment. 62.5 mg. griseofulvin orally per day, ca. 1 gm. TBZ ointment (1% TBZ in carrier).

Preparation of inoculum

In vitro studies on dermatophytic fungi. The fungi tested are listed in Table I below, together with an indication of the source of the strain.

Preparation of inoculum

Tubes were filled with 5 ml. of Eugon broth (BBL labs.). Spores of the dermatophytes were introduced into the tubes which were placed on a roller drum at temperatures of from 25–27° C. for 2–3 weeks.

Growth tests

Twenty-one (21) ml. of Eugon broth was dispensed into 50 ml. screw-capped Erlenmeyer flasks and inoculated with 1/20 ml. of above-described inoculum. In the case of *Microsporum audouinii* and *Trichophyton concentricum* micro- or macroaleuriospores from a two weeks culture on Sabouraud's agar (BBL Labs.) were employed in place of the aforementioned inoculum. Three grams of thiabendazole were dissolved in 3 ml. of dimethyl sulfoxide and added to the inoculated cultures in amounts giving rise to concentrations of from 5.0 to 0.01 micrograms of thiabendazole per ml. of medium. Appropriate dimethyl sulfoxide controls were also utilized.

Three grams of griseofulvin were dissolved in 3 ml. of acetone and added to the test media to yield concentrations of griseofulvin therein from 20.0 to 0.05 micrograms per ml. of medium. Appropriate acetone controls were also tested. In the test where both thiabendazole and griseofulvin were to be tested in combination, the same solution sources were employed.

After addition of the thiabendazole and/or griseofulvin, the cultures were grown at 34° C. in a New Brunswick environmental shaker for 5 days at 200 r.p.m. Upon completion of the growth test, the cultures were visually examined. The minimum inhibitory concentration (MIC) is defined as that concentration of antifungal agent which completely prevents any visible growth of the organism tested. The results of these tests are summarized in Table I below.

TABLE I.—EFFECT OF GRISEOFULVIN, THIABENDAZOLE AND GRISEOFULVIN-THIABENDAZOLE ON DERMATOPHYTIC FUNGI

[Minimal inhibitory concentration (MIC) microgram per cc.]

| Organism | Origin of strain | Griseofulvin (MIC) | Thiabendazole (MIC) | Griseofulvin/Thiabendazole (MIC) |
|---|---|---|---|---|
| *Trichophyton rubrum* | DT-1 | 1.0 | 0.5 | 0.05/0.016 |
| *T. rubrum* | DT-2 | 1.0 | 0.5 | 0.05/0.016 |
| *T. mentagrophytes* | NZ-36 | 2.0 | 1.0 | 1.0/0.5 |
| Do.[1] | NZ-80 | 20.0 | 2.5 | 2.0/1.0 |
| Do.[1] | NZ-88 | 20.0 | 2.5 | 2.0/1.0 |
| Do.[1] | NZ-89 | 20.0 | 2.5 | 1.0/1.0 |
| *T. concentricum* | CDC-10 | 2.0 | 1.0 | 0.5/0.2 |
| Do | CDC-17 | 2.0 | 1.0 | 0.5/0.2 |
| Do | CDC-19 | 1.0 | 0.5 | 0.5/0.2 |
| Do | CDC-29 | 1.0 | 0.5 | 0.2/0.1 |
| *T. tonsurans* | NZ-35 | 1.0 | 1.0 | 0.1/0.05 |
| *Microsporum audounii* | NZ-78 | 0.5 | 0.1 | 0.1/0.05 |
| *M. canis* | NZ-37 | 2.0 | 0.5 | 0.2/0.05 |
| *M. gypseum* | NZ-32 | 2.0 | 1.0 | 0.5/0.2 |
| *Epidermophyton floccosum* | NZ-31 | 2.0 | 1.0 | 0.2/0.1 |

[1] Morphologically different isolates from one patient clinically resistant to griseofulvin.

EXAMPLE II

After a total of 3 weeks of incubation under the conditions of Example I, the contents of the tubes in which no apparent growth of fungi were noted, were filtered through a 0.04 micro millipore membrane. The residue was washed three times with Eugon broth and the entire filter, containing the inoculum elements, was planted in a petri dish containing Sabouraud's 1% yeast agar and incubated for 2 weeks at 30° C. At the end of this time, the samples were inspected to determine whether the fungus was alive (static effect) or dead (cidal effect). Thus, the fungicidal and fungistatic concentrations of the griseofulvin/thiabendazole combination could be determined. These results are summarized in Table II below.

TABLE II

| Organism | Number of strains | Origin | Griseofulvin (MIC) | Thiabendazole (MIC) | Griseofulvin/thiabendazole (MIC) |
|---|---|---|---|---|---|
| Mycetoma-Cromoomycosis: | | | | | |
| *Cladosporium carrioni* | 1 | NZ-25 | Growth | 0.5 | .5/.5 |
| *Madurella grisea* | 1 | CDC-B 1004 | do | 0.5 | .5/.5 |
| *M. mycetomii* | 1 | CDC-B 1002 | 1.0 | 0.5 | .5/.5 |
| Yeast: | | | | | |
| *Candida albicans* | 5 | NZ | Growth | Growth | Growth |
| *Cryptococcus neoformans* | 5 | CDC-LA | do | 16 | 32/16 |
| Other: | | | | | |
| *Sporothrix schenckii* (yeast form) | 4 | NZ | do | Growth | Growth |
| *Paracoccidioides brasiliensis* | 5 | DB | At 2.0 | At 1.0 | 1./.5 |

EXAMPLE III

Deep mycosis fungi—*Histoplasma capsulatum*

Yeast form cells of *H. capsulatum* were obtained by growing isolates on slants of Brain Heart Infusion Agar (Difco) at 37° C. for 14–21 days. The cells were inoculated into Brain Heart Infusion Broth (Difco, pH 7.0) and the test carried out in the same manner using this medium as those carried out on the dermatophytes using Eugon broth. The results for the various strains tested are summarized in Table III below. NG signifies no growth and the amount of growth from trace growth through normal unaffected growth is signified by the numbers 1 through 4.

flasks containing the same drug or the same solvent. The inhibitory effect was then measured by comparing the TABLE III.—EFFECT OF GRISEOFULVIN, THIABENDAZOLE AND GRISEOFULVIN-THIABENDAZOLE ON A SPECIES OF DEEP FUNGI

[Micrograms per ml]

| | Griseofulvin | | | | Thiabendazole | | | | Griseofulvin/thiabendazole | | | | |
|---|---|---|---|---|---|---|---|---|---|---|---|---|---|
| | 32 | 16 | 8 | 4 | 16 | 8 | 4 | 2 | .32/16 | 16/8 | 8/4 | 4/2 | Central |
| *Histoplasma capsulatum:* | | | | | | | | | | | | | |
| 105 | NG | 1+ | 3+ | 3+ | NG | NG | 3+ | 3+ | NG | NG | 2+ | 2+ | 4+ |
| L261 | NG | 1+ | 2+ | 3+ | NG | 1+ | 3+ | 3+ | NG | NG | 4+ | 4+ | 4+ |
| A827 | 1+ | 3+ | 4+ | 4+ | NG | 1+ | 4+ | 4+ | NG | NG | 3+ | 3+ | 4+ |
| D917 | NG | 2+ | 3+ | 3+ | NG | 1+ | 3+ | 3+ | NG | NG | 3+ | 3+ | 4+ |
| B923 | NG | 1+ | 3+ | 3+ | NG | 1+ | 2+ | 2+ | NG | NG | 2+ | 2+ | 4+ |

EXAMPLE IV

Deep mycosis fungi—*Paracoccidiodes brasiliensis*

Strains and cultural procedures: Two (2) strains of *Paracoccidiodes brasiliensis* (C81 and B339) were used in this study. Each of the strains was grown in the yeast phase in submerged shaken cultures in a trypticase dialysate medium by the method of Restrepo and Schneidau, J. Bact. 92, 1941 (1967). The medium was distributed at 250 ml. amounts in 250 ml. Erlenmeyer flasks.

Culture for the inoculum was prepared by inoculating a 250 ml. Erlenmeyer flask containing 250 ml. of a trypticase dialysate medium with a loopful of a 10 day old culture on Kelly's medium. The flask was incubated at 35° C. on a gyrotory shaker (New Brunswick Scientific Co., N.J.) at 108 strokes per minute for 5 days.

One (1) milliliter amounts of this stock culture served for the inoculation of new flasks of the same size containing the same amount of the dialysate medium to which were also added the antifungal agents and/or the solvents.

Viable cell counts were run in duplicate along with the stock culture. Plates were made with Mycosel agar (BBL, Cockeyville, Md.) and incubated at room temperature (22-25° C.) for 21 days before counting the colonies.

number of viable cells present in the inoculum with those in the new flasks.

Although cultures were incubated for a total of 4 weeks, further counts were not deemed necessary as the aspect of the cultures was unchanged after the first 15 days of incubation.

The results are summarized below in Table V. These results show that the MIC for *Paracoccidioides brasiliensis* is for the griseofulvin/thiabendazole combination comprises a mixture of 2 mcg./ml. of griseofulvin and 1 mg./ml. of thiabendazole.

TABLE V.—MIC AND FUNGICIDAL CONCENTRATIONS OF VARIOUS FUNGI

[Micrograms per ml.]

| Organism | Griseofulvin/ Thiabendazole inhibitory concentration | "Cidal" concentration |
|---|---|---|
| *Trichophyton rubrum* | .05/.01 | .1/.1 |
| *T. rubrum* | .05/.01 | .2/.1 |
| *T. concentricum* CDC-19 | .5/.2 | .5/.2 |
| *T. concentricum* CDC-17 | .5/.2 | .5/.2 |
| *T. concentricum* CDC-29 | .1/.1 | .2/.1 |
| *T. tonsurans* NZ-35 | .1/.05 | .2/.1 |
| *Microsporum gypseum* | .5/.2 | Fungistatic |
| *M. canis* | .1/.1 | Fungistatic |
| *Epidermophyton floccusum* | .1/.1 | .5/.2 |
| *Madurella grisea* | 0/.4 | 0/.5 |
| *Cladosporium carrioni* | 0/.5 | Fungistatic |

TABLE IV.—EFFECT OF GRISEOFULVIN, THIABENDAZOLE AND GRISEOFULVIN-THIABENDAZOLE ON *PARACOCCIDIOIDES BRASILIENSIS* (YEAST PHASE)

| | Controls | | | Drugs | | |
|---|---|---|---|---|---|---|
| Days of incubation | Water | DMSO | Acetone | Griseofulvin (2.0 mcg./ml.) | Thiabendazole (1.0 mcg./ml.) | Griseofulvin (2.0 mcg./ml. and thiabendazole 1.0 mcg./ml.) |
| | Viable cell counts per ml. | | | | | |
| (3)— | | | | | | |
| 7 | ¹ 16,986 | ¹ 13,343 | ¹ 13,343 | ² 3,186 | ² 17,624 | ² 209 |
| 15 | ¹ 38,400 | ¹ 40,400 | ¹ 37,600 | ² 6,888 | ² 32,800 | ² 576 |
| (4)— | | | | | | |
| 7 | ¹ 9,452 | ¹ 9,062 | ¹ 9,102 | ² 3,392 | ² 9,632 | ² 105 |
| 15 | ¹ 12,890 | ¹ 14,310 | ¹ 12,720 | ² 8,540 | ² 17,950 | ² 0 |

¹ Mean for 3 flasks.
² Mean for 5 flasks.
³ 4,360 viable cells in original inoculum.
⁴ 3,800 viable cells in original inoculum.

Antifungal agents: Three grams of thiabendazole were dissolved in 3 cc. of dimethyl sulfoxide and added to the media to give concentrations that ranged from 5.0 to 0.01 micrograms per ml. of media. An appropriate dimethyl sulfoxide control was also tested.

Three grams of griseofulvin were dissolved in 3 cc. of acetone and added to the media to make up concentrations ranging from 20.0 to 0.05 microgram per ml. of media. Stock solutions were added to the medium before autoclaving to make up concentrations ranging from 1.0 to 2.0 micrograms and from 0.1 to 1.0 microgram of griseofulvin and thiabendazole per ml. of medium, respectively. A complete experiment comprised a series of 24 flasks, 5 for each one of the two antifungal agents, 5 for the combination thereof and 3 each for the various controls (water, acetone, and dimethyl sulfoxide).

Viability studies: Once inoculated the flasks were incubated at 25° C. in the shaker for 4 weeks, viable counts, run in duplicate, were performed at 7 and 15 days of growth. Mean values were obtained for each series of

EXAMPLE VI

The subject of treatment was a boy age ca 8 weight ca 20 kg. with a facial infection of *T. mentagrophytes*. The patient received griseofulvin (2 g. p.o. per diem) for three weeks. To one half of the infected area of his face was administered an ethanolic solution of thiabendazole ca. 8.5 ml./diem (250 mg. of thiabendazole/100 ml. ethanol) Dosage: griseofulvin: 100 mg./kg./day; thiabendazole: ca 1.05 mg./kg./day.

At the end of three weeks the control area (no thiabendazole) showed very slight remission and the thiabendazole area showed minimal observable infection. Treatment was continued for 4 weeks applying thiabendazole solution over the entire infected area. Griseofulvin dose (62.5 mg. p.o., per diem). Thiabendazole ca. 8.5 ml./diem (250 mg. of thiabendazole/100 ml. ethanol). Dosage: griseofulvin ca. 31 mg./kg./day; thiabendazole ca. 1.05 mg./kg./day. Total remission of infection was observed.

Where for clinical reasons it is not suitable to use ethanol as a vehicle for thiabendazole, any pharmacologically acceptable ointment may be used, however, since the penetration of the dermal layer by the thiabendazole is not so efficient with an ointment, an ointment containing 10% by weight of thiabendazole should be used.

EXAMPLE VII

Two adult male patients (wt. ca. 50 kg.) infected with bilateral foot ringworm (*T. rubrum*) were treated for four weeks with griseofulvin (250 mg. p.o. per diem) and topical administration of ethanolic thiabendazole ca. 8.5 ml. per diem. (250 mg. thiabendazole/100 ml. ethanol). Dosage: griseofulvin 5 mg./kg./day; thiabendazole 0.425 mg./kg./day. Remission was complete.

EXAMPLE VIII

Six adults males (wt. ca. 50 kg.) infected with pulmonary South American blastomycosis (caused by *Paracoccidioides brasiliensis*) were treated with griseofulvin and thiabendazole administered orally. There is no known cure for this disease which has always been considered fatal. Administration was griseofulvin (2 gm. p.o. per diem), thiabendazole (1 gm./p.o./per diem). Dosage: griseofulvin: 25 mg./kg./day; thiabendazole: 20 mg./kg./day.

After about 3 weeks the four patients were sufficiently recovered that they left the hospital voluntarily and did not return. After a total of 7 weeks the remaining two patients were discharged as completely cured.

I claim:

1. An orally administrable fungicidal composition effective against dermatophytic fungi comprising about 2 parts of griseofulvin to about 1 part of thiabendazole.

2. A method of treating a human subject infected with dermatophytic fungi comprising administering an effective amount for treating dermatophytic fungi of a combination of orally administered griseofulvin and transdermally administered thiabendazole wherein there are administered orally about 2 parts of griseofulvin and about 1 part of thiabendazole in a topical carrier.

References Cited

The Meeck Index, 8th edition, Meeck & Co., Inc., Rahway, N.J., 1968, pp. 508 and 1035.

JEROME D. GOLDBERG, Primary Examiner

U.S. Cl. X.R.

424—285